United States Patent Office 3,190,123
Patented June 22, 1965

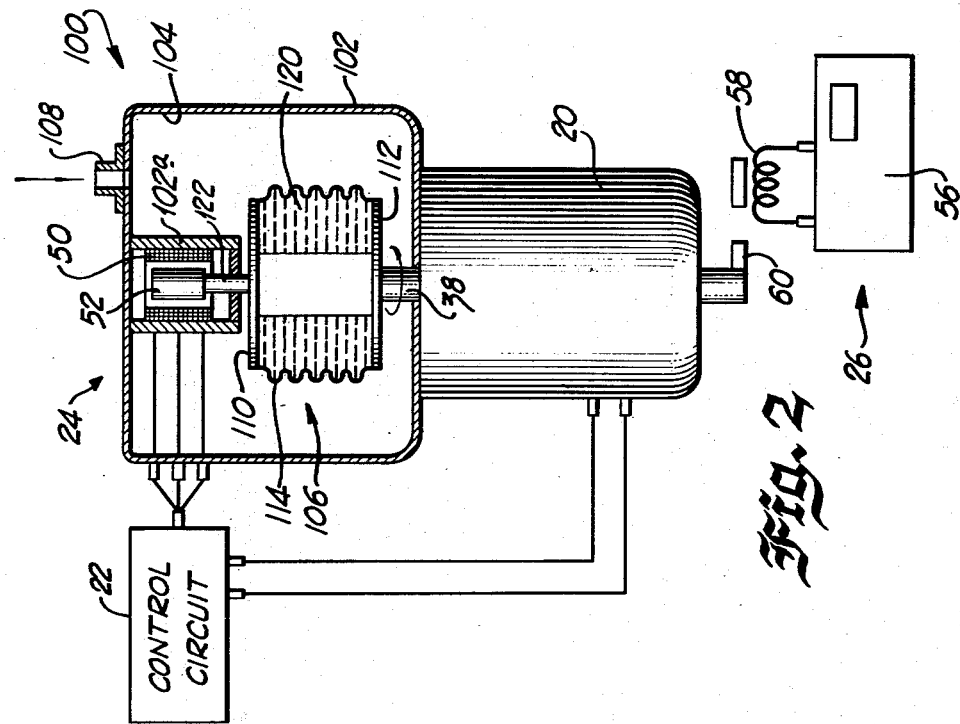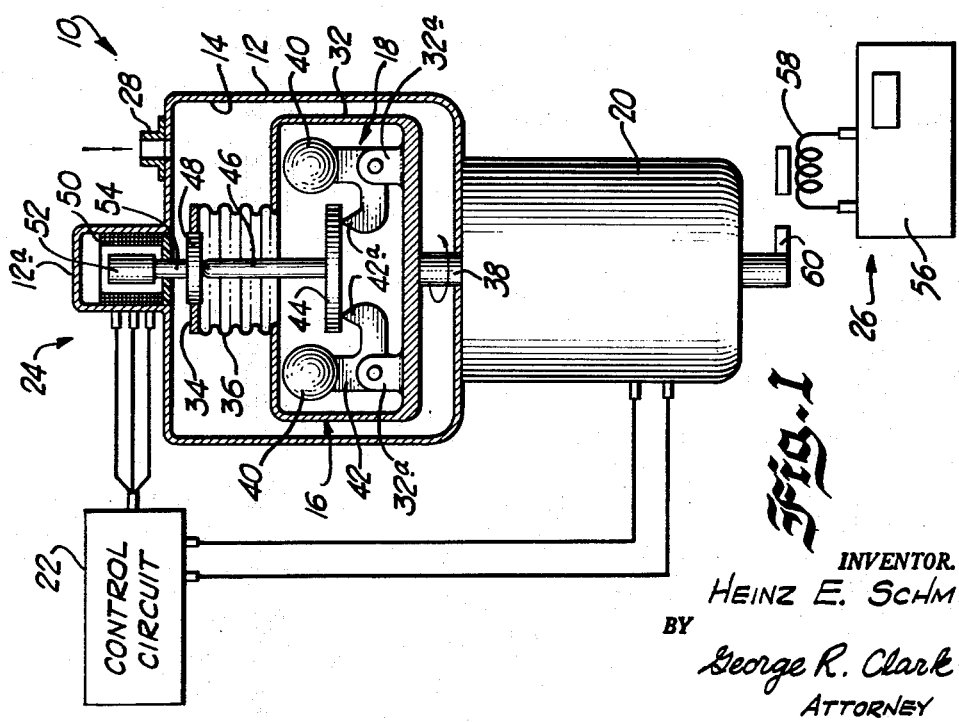

3,190,123
FORCE MEASURING MEANS
Heinz E. Schmitt, Racine, Wis., assignor to John Oster Manufacturing Co., Milwaukee, Wis., a corporation of Wisconsin
Filed Jan. 16, 1961, Ser. No. 83,070
1 Claim. (Cl. 73—398)

This invention relates to a means for measuring force and, more particularly, to a new and improved force transducer using centrifugally generated forces.

In many types of mobile and stationary equipment, it is necessary to accurately determine the magnitude of a variable applied force, either as an absolute quantity or in terms of the ratio between two forces. Modern aircraft and space vehicles, for instance, require accurate Mach number indicators, altimeters, and air speed indicators, and the quantities or factors indicated by these instruments are generally determined by measuring variable forces or force ratios resulting from differences in air pressure. These air pressures are conventionally measured by balancing the force due to the air pressure with a known force obtained from spring means. However, the nonlinearity and temperature sensitivity of springs adversely affect the accuracy of this type of device. Another type of measuring device that avoids the deficiencies of springs comprises a bellows actuated force balancing system including a mechanical linkage, such as a lever system with a shifting fulcrum or a mechanical parallelogram with sides of adjustable length. However, these latter systems lack accuracy when large pressure ratios are to be measured, are difficult to maintain in adjustment, and require an excessive amount of installation space.

In an attempt to overcome some of these deficiencies, efforts have been made to measure a variable force by balancing the variable force with a controlled centrifugally generated force. The force to be measured is applied to a bellows assembly, and the displacement of the bellows assembly is opposed by an adjustable known force generated by the rotation of a plurality of flyweights by a variable speed drive means. This technique is basically insensitive to the errors occurring in other types of force measuring systems and does not require excessive installation space or maintenance. However, the prior devices using a centrifugally generated balancing force require thrust bearings because of the axial forces applied to the drive shaft for rotating the flyweights. When these thrust bearings are subjected to heat and wear, an axial displacement of some of the rotating parts of the unit occurs with a resulting decrease in the accuracy of the unit.

Accordingly, one object of the present invention is to provide a new and improved means for measuring force.

Another object is to provide a new and improved force transducer using a centrifugally generated balancing force.

Another object is to provide a force measuring device which uses a centrifugally generated force and which obviates the need for thrust bearings.

A further object is to provide a force measuring device using a rotating bellows means.

Another object is to provide a force measuring system possessing a high degree of accuracy that includes a rotating bellows assembly containing a body of liquid.

In accordance with these and many other objects, an embodiment of the invention comprises a sealed chamber in which is disposed a rotatably mounted bellows or diaphragm assembly. The sealed chamber is supplied with air or other media having a pressure representing the force to be measured, and the pressure of the air introduced into the sealed chamber acts on the exterior surfaces of the bellows assembly to produce a displacement thereof. To overcome or resist this displacement, centrifugally operated means are provided within the rotating bellows assembly for producing an oppositely directed force that tends to prevent displacement of the bellows assembly. In a first embodiment, a plurality of flyweights are mounted within the bellows assembly to provide a force opposing the force due to the air pressure acting on the exterior of the bellows assembly. In a second embodiment, the bellows assembly is at least partially filled with a liquid.

To provide means for rotating the bellows assembly, a rigid wall portion thereof is secured to the shaft of a variable speed drive means, such as a servomotor. The speed of rotation of the motor is controlled by a control circuit including a sensing means responsive to a displacement of the bellows assembly. This sensing means can comprise a differential transformer having a magnetic core movable in response to displacement of a portion of the bellows or diaphragm assembly.

In operation, air having a pressure to be measured is supplied to the sealed chamber to act on the exterior surface of the bellows assembly so that this assembly is displaced in an amount and direction proportional to the unknown force. This displacement of the bellows assembly is detected by the sensing means so that the control circuit changes the speed of the variable speed drive means to increase or decrease the speed of rotation of the bellows assembly in accordance with the direction of the displacement. This change in speed changes the centrifugal force generated by either the liquid or the flyweights so that the force due to the change in air pressure is opposed or balanced. In this manner, the speed of the variable speed drive means is continuously adjusted to provide centrifugally generated forces balancing the forces due to the pressure of the air. To provide an indication of the magnitude of the variable force, the drive means also actuates a signal generator so that a variable frequency signal or a pulse stream including a number of pulses proportional to the speed of the motor is generated. Since the generated force is proportional to the square of the motor speed represented by the pulse stream, the signal generated by the drive means can actuate a frequency meter or counter to provide an indication of the force to be measured.

Many other objects and embodiments of the present invention will become apparent from considering the following detailed description in conjunction with the drawings in which:

FIG. 1 is a schematic diagram of one embodiment of a force measuring system which embodies the present invention and which includes a plurality of flyweights;

FIG. 2 is a schematic diagram of a force measuring system forming a second embodiment of the invention that includes a rotating bellows assembly containing a liquid.

Figure 3:
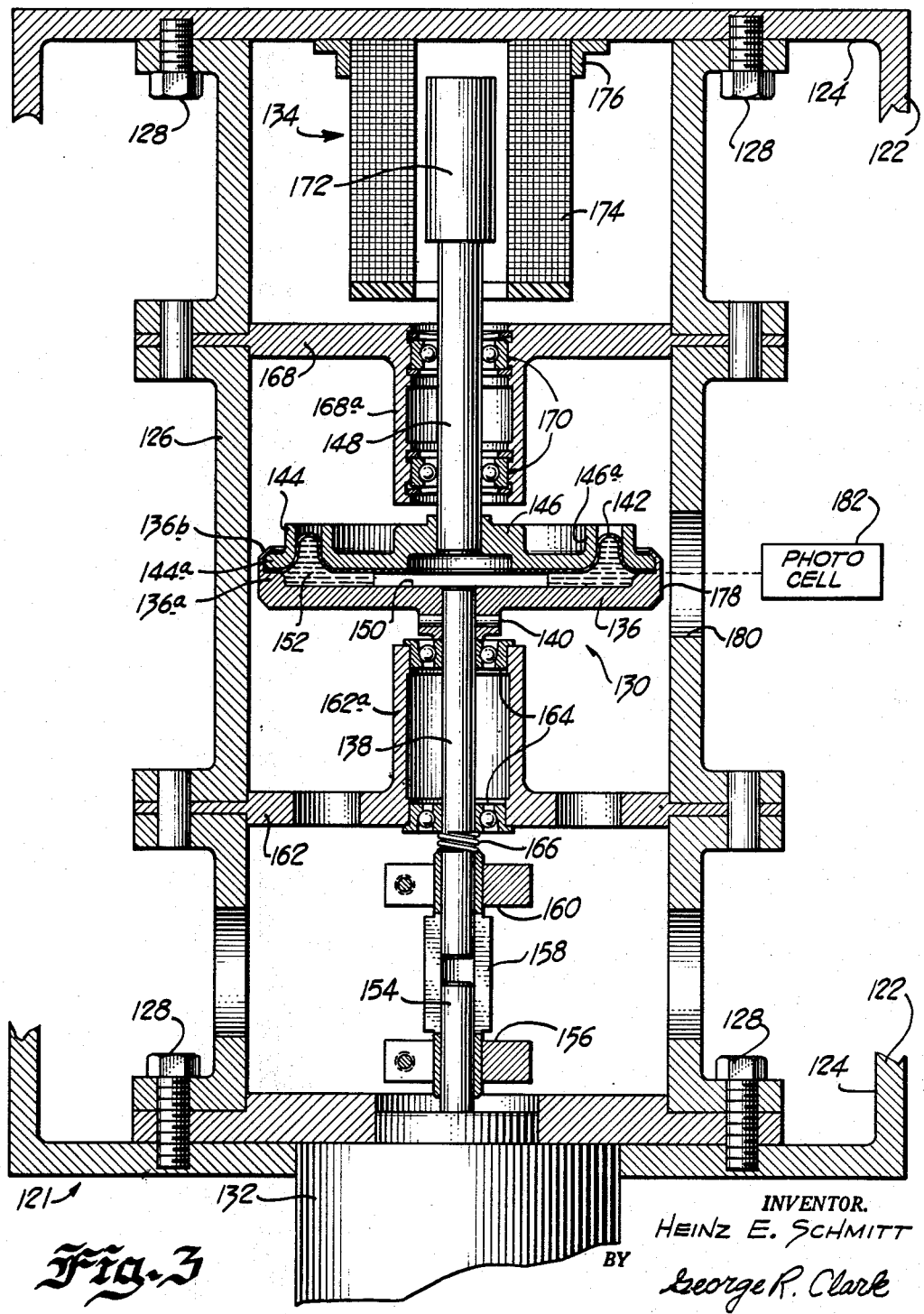
FIG. 3 is a sectional view of another force measuring unit having a rotating bellows assembly containing a body of liquid.

Referring now more specifically to FIG. 1 of the drawings, therein is shown a force measuring unit, indicated generally as 10, which embodies the present invention and which includes a frame or housing 12 defining a sealed chamber 14 in which a sealed bellows assembly 16 is mounted. The chamber 14 is provided with air having a pressure representing the force to be measured, and force due to this air acts on the exterior surfaces of the assembly 16 to displace a movable portion of the bellows assembly 16. A centrifugally operated flyweight assembly, indicated generally as 18, is disposed within the bellows assembly 16 and is adapted, upon rotation of the bellows assembly, to provide a force that opposes or balances the force provided by the air.

For rotating the centrifugally operated means 18, the bellows assembly 16 is driven by a variable speed drive means 20, the input of which is connected to a control circuit 22. The input of the control circuit 22 is connected to a sensing assembly 24 that provides signals representing the displacement or position of the movable portion of the bellows assembly 16. Thus, whenever the bellows assembly 16 is displaced by the air under pressure introduced into the chamber 14, the sensing unit 24 controls the control circuit 22 so that the variable speed drive means 20 rotates the bellows assembly 16 at an increased or decreased speed. This actuates the centrifugally operated means 18 to provide an opposing force balancing the force due to the air pressure. To provide an indication of the pressure of the air admitted to the chamber 14, an indicating or output means, indicated generally as 26, is actuated by the drive means 20 to provide an indication of the speed at which the bellows assembly 16 is rotated. Since the air pressure varies as the square of this speed, the indicating means 26 can provide a direct indication of the force to be measured.

The frame structure 12 comprises a generally cylindrical housing of a suitable material, such as metal, and includes an upper cylindrical portion 12a in which the sensing means 24 is mounted. An inlet 28 secured to an upper wall of the housing 12 provides means for introducing air of a pressure representing the force to be measured. As an example, the inlet 28 can be connected by suitable conduit means to a surface of an aircraft or other source of air whose pressure varies in accordance with a force or other quantity to be measured.

The bellows assembly 16, which is disposed within the sealed chamber 14, includes a pair of rigid wall portions 32 and 34 connected by a cylindrical, flexible wall section 36. The wall portion 32 is somewhat cylindrical and includes a lower wall secured at its center to a shaft 38 of the drive means or motor 20. The upper wall of the wall portion 32 defines a centrally disposed opening, and the portion of the upper wall forming this opening is secured to the lower end of the flexible wall section 36. The upper end of the wall section 36 is secured to the rigid wall portion 34, which wall portion is generally cylindrical in configuration and is concentric with the axis of the shaft 38. The interior of the bellows assembly 16 is evacuated or provided with an atmosphere of a known pressure. Since the lower wall of the wall portion 32 is secured against axial movement by its connection to the shaft 38, the air admitted into the chamber 14 provides a force acting on the upper surface of the rigid wall portion 34 that tends to displace this wall portion upwardly or downwardly along the axis of the shaft 38. The degree of this displacement and its direction are determined by the increase or decrease in the pressure of the air admitted into the chamber 14.

To provide a means for balancing the force exerted on the plate 34 by the air within the chamber 14, the centrifugally operated means 18 disposed within the bellows assembly 16 is provided. The means 18 includes a pair of flyweights 40 secured to the ends of a pair of bell cranks 42. These cranks are pivotally mounted on a pair of lugs 32a projecting upwardly from the lower wall of the wall portion 32. The bell cranks 42 include beveled end portions 42a that bear against the lower surface of a plate 44 to which is secured a rod 46 having its upper end engaging and bearing against the lower surface of a member 48 that is secured to the rigid wall portion 34. The rod 46 is aligned with the shaft 38.

When the bellows assembly 16 is rotated by the drive means 20 and the shaft 38, the flyweights 40 are displaced outwardly from the axis of rotation of the shaft 38 so that the left-hand bell crank 42 is pivoted in a counterclockwise direction and the right-hand bell crank 42 is pivoted in a clockwise direction. The engagement of the beveled ends 42a of the bell cranks 42 with the plate 44 displaces the rod 46 and the plate 44 upwardly so that an axially directed force is applied to the lower surface of the member 48 that is secured to the movable wall portion 34. The magnitude of this force is determined by the speed of rotation of the assembly 16. In this manner, the force due to the pressure of the air tending to move the wall 34 can be offset or exactly balanced by a variable upwardly directed force generated by controlling the speed of the motor 20.

In order to reduce any errors arising from eccentricity, the bellows assembly 16 and the components of the centrifugally operated means 18 are symmetrically or concentrically disposed about the axis of the shaft 38. Since the air in the chamber 14 acts on substantially equal upper and lower surfaces of the bellows assembly 16, no axially directed forces are applied to the shaft 38, and there is no need to provide thrust bearings in the force measuring unit 10 other than those required to support the weight of the assembly 16 when the unit 10 is vertically mounted. As noted above, these thrust bearings often are a source of inaccurate results.

The variable speed drive means 20 for rotating the shaft 38 and the bellows assembly 16 can be provided by any of the means well known in the art and can include such well known devices as variable speed transmissions. In the embodiment shown in FIG. 1 of the drawings, the variable speed drive means 20 preferably comprises a servomotor whose speed of rotation is controlled by the control circuit 22 in response to signals received from the sensing unit 24. If the servomotor 20 is mounted in the atmosphere, it is necessary to provide a seal for the shaft 38 between the housing 12 and the atmosphere. Alternatively, the drive motor 20 can be disposed in a continuation of the sealed housing 12 so that any problem of providing a suitable seal for the rotating shaft 38 is avoided.

To provide means for detecting the displacement of the movable wall portion 34 of the bellows assembly 16, the sensing unit 24 is provided. Although any one of the numerous position sensing means well known in the art can be used, the sensing unit 24 preferably comprises a differential transformer including a plurality of windings 50 mounted on the inner wall of the housing portion 12a and defining an axial opening in which is disposed a magnetic core 52. The magnetic core 52 is supported on the member 48 by a nonmagnetic shaft 54 disposed therebetween. The shaft 54 can be suitably journaled in a bearing carried on the frame 12 that permits both longitudinal and rotary movement of this shaft. This bearing means prevents radial displacement of the wall 34 during rotation of the bellows assembly 16 and serves to guide vertical rectilinear movement of the core 52 as well as rotary movement thereof.

When the vertical position of the magnetic core 52 is varied in accordance with displacement of the wall portion 34 in the bellows assembly 16, the windings 50 supply signals to the control circuit 22 so that the speed of the drive motor 20 is increased or decreased in accordance with the direction of displacement of the wall 34. The construction of a control circuit 22 that will supply an output signal that increases and decreases in potential, frequency or phase in accordance with the input signal provided by a differential transformer is well known in the art. When the upwardly directed force generated by the centrifugally operated means 18 equals the force due to the air within the chamber 14, the speed of the servomotor 20 is maintained constant. Since the speed of rotation of the drive means 20 varies directly as the square root of the force due to the pressure of the air in the chamber 14, a measurement of the speed of the motor 20 provides an indication of the air pressure or force to be measured.

To provide an indication of the air pressure, the indicating means 26 controlled by the speed of rotation of the motor 20 is provided. Although any suitable means well known in the art for indicating motor speed can be used as the indicating means 26, the means 26 embodied in the force measuring unit 10 preferably comprises a counter 56 having an inductive or electromagnetic pick-up coil 58 connected to its input. The shaft 38 of the motor 20 or a shaft driven in synchronism therewith is provided with a magnetic tooth 60 or a toothed wheel that is disposed in proximity to the pickup coil 58. As the tooth 60 moves relative to the pickup coil 58, a pulse is generated for actuating the counter 56. By initiating a cycle of operation of the couner 56 and terminating this counting cycle at the end of a known period of time, the number of pulses received as a result of rotation of the shaft 38 of the motor 20 provides a direct readout in digital form of the speed of rotation of the motor 20. This provides an indication of the square root of the pressure of the air supplied to the chamber 14. If desired, the counter 56 can be calibrated or controlled by known means to provide a direct reading of the air pressure or force. Further, a direct current signal generator, such as a tachometer, can be driven in synchronism with the shaft 38 to provide an analogue signal for operating an indicating means that directly indicates air pressure or force.

In operation, air having a pressure representing the force to be measured is introduced into the chamber 14 so that a force acts on the wall portion 34 tending to move this wall portion upwardly or downwardly. This movement of the well section 34 displaces the magnetic core 52 so that the windings 50 in the differential transformer forward a signal to the control circuit 22 indicating an unbalanced condition. The control circuit 22 supplies an energizing signal to the servomotor 20 representing the displacement and this signal increases or decreases the speed of rotation of the shaft 38 and of the bellows assembly 16 secured thereto. This produces a corresponding increase or decrease in the axially directed force acting upwardly on the member 48 due to the centrifugally induced pivotal movement of the bell cranks 42 to which the flyweights 40 are secured. When the speed of rotation of the shaft 38 has been adjusted to a point at which the upwardly directed force provided by the centrifugally operated means 18 balances the downwardly directed force acting on the wall section 34 due to the air in the chamber 14, the speed of rotation of the drive motor 20 provides an accurate representation of the magnitude of the force to be measured. Thus, the pulses applied to the counting circuit 56 by the pickup coil 58 and the magnetic tooth 60 provide a direct indication of the force to be measured.

Referring now more specifically to FIG. 2 of the drawings, therein is shown a force measuring unit, indicated generally as 100, that embodies the present invention. The force measuring unit 100 embodies the same general operating technique as the force measuring unit 10 but is capable of obtaining an even higher degree of accuracy by avoiding any errors that might result from friction in the bearing surfaces used in the centrifugally operated means 18, such as the frictional engagement of the beveled ends 42a of the bell cranks 42 with the member 44 and the friction in the pivotal mounting for these bell cranks. To facilitate a comparison of the units 10 and 100, like reference numbers have been used in FIGS. 1 and 2 of the drawings to indicate like components of the force measuring units 10 and 100.

In general, the force measuring unit 100 indicates a housing 102 forming a sealed chamber 104 for receiving a bellows assembly 106 that is at least partially filled with liquid. The bellows assembly 106 is secured to the shaft 38 of the drive motor 20 so that when the assembly 106 is rotated, the centrifugal force acting on the liquid produces an axially directed force opposing the force due to the pressure of the air in the chamber 104. The speed of the motor 20 is controlled by the control circuit 22 under the control of the sensing unit 24 to provide a centrifugally generated force equaling or balancing the force due to the air. The indicating means 26 is controlled by the speed of rotation of the drive motor 20 so that the counter 56 provides a digital indication of the force to be measured resulting from the pressure of the air within the chamber 104.

The housing 102 is substantially identical to the housing 12 provided in the force measuring unit 10 and includes a downwardly extending and centrally located housing portion 102a on which the windings 50 of the sensing unit 24 are mounted. An upper wall of the housing 102 is provided with an inlet 108 through which air having a pressure varying in accordance with the force to be measured is supplied to the chamber 104. If the drive motor 20 is not included within the sealed housing 102, a seal for the rotating shaft 38 is provided.

The bellows assembly 106 includes a rigid upper end plate 110 and a rigid lower end plate 112 that is centrally secured to the upper end of the shaft 38. A flexible, outer cylindrical wall 114 is secured to and extends between the outer edges of the circular plates 110 and 112 to define a sealed cavity or chamber 120. The chamber 120 is at least partially filled with a suitable liquid, such as alcohol, mercury or oil. When the bellows assembly 106 is rotated, the liquid is displaced radially outwardly by centrifugal force so that the center of the chamber 120 is evacuated. Further, since this outward movement of the liquid is restrained by the flexible wall 114, a force directed along the axis of the shaft 38 is developed. Inasmuch as the plate 112 is secured to the shaft 38, this axially directed force tends to displace the top plate 110 upwardly against the force provided by the pressure of the air within the chamber 104.

The magnitude of the axially directed force acting on the lower surface of the plate 110 is dependent on the mass of the liquid contained within the chamber 120. Therefore, with air supplied to the chamber 104 in a given range of pressures, it is possible to select the range of speed over which the motor 20 is to operate by selecting a liquid for the bellows assembly 106 having a particular specific gravity. As an example, if it is desirable to operate the motor 20 at a lower speed when air of a given range of pressure is supplied to the chamber 104, a liquid of high specific gravity is selected. Conversely, the selection of a filling liquid having a low specific gravity would require a drive means 20 having a higher range of speed. Alternatively, if the range of speed of the drive means 20 is to be maintained constant in different applications of the force measuring unit 100, the specific gravity of the liquid used in the rotating bellows assembly 106 can be selected in accordance with the different pressure ranges of the air to be supplied to the chamber 104.

To provide means for connecting the magnetic core 52 in the sensing unit 24 to the rotating bellows assembly 106 and in order to prevent radial deflection or displacement of the top plate 110, a shaft 122 of nonmagnetic material is secured to the lower end of the magnetic core 52 and to the top surface of the plate 110 in alignment with the shaft 38. An intermediate portion of the shaft 122 is journaled for rotary and rectilinear movement by suitable bearing means carried on the lower end of the housing portion 102a. This bearing permits vertical movement of the core 52 in response to displacement of the plate 110 in the bellows assembly 106 and also restrains the plate 110 against displacement when the bellows assembly 106 is rotated by the shaft 38.

In operation, a conduit or other fluid conveying means connected to the inlet 108 supplies air to the chamber 104 having a pressure representing the force to be measured. This air provides a force acting on the walls 110 and 112 of the bellows assembly 106 and tends to displace the end plate 110 because of the rigid connection of the lower plate 112 to the shaft 38. This displacement of the plate 110 produces a corresponding displacement of the magnetic core 52 so that an unbalance signal is supplied to the control circuit 22. This signal causes the control circuit 22 to increase or decrease the speed of rotation of the motor 20 so that the rotation of the liquid in the chamber 120 of the bellows assembly 106 produces an increased or decreased force acting on the plate 110 in a direction parallel to the axis of rotation of the shaft 38. The speed of the motor 20 is changed until the oppositely directed forces acting on the end plate 110 are balanced. At this time, the speed of rotation of the motor 20 is directly proportional to the force to be measured represented by the pressure of the air within the chamber 104. The magnetic tooth 60 and the pickup coil 58 again supply operating signals to the counting circuit 56 in the indicator 26 so that an indication of the pressure of the air in the chamber 104 or the force to be measured is provided.

FIG. 3 of the drawings illustrates a force measuring unit, indicated generally as 121, which embodies the present invention and which is similar to the force measuring unit 100. The force measuring unit 121 includes a sealed housing 122 defining a chamber 124 in which is mounted a generally cylindrical supporting frame 126. The supporting frame 126 is secured to the upper and lower walls of the housing 122 by a plurality of headed fasteners 128. The frame 126 rotatably supports a bellows or diaphragm assembly 130 that is rotated by a variable speed drive means or motor 132. The motor 132 can be secured to the housing 122.

The chamber 124 is supplied with air having a pressure representing the force to be measured, and the force resulting from the pressure of the air tends to displace a shiftable portion of the diaphragm assembly 130. The assembly 130, which is at least partially filled with a suitable liquid, is rotated by the motor 132 to develop a force opposing the displacing force resulting from the air admitted to the chamber 124. To provide a means for detecting displacement of a portion of the diaphragm assembly 130, a sensing means 134 is supported on the frame 126 and is actuated by displacement of a portion of the diaphragm assembly 130. The output signals generated by the sensing unit 134 are used to control a circuit similar to the circuit 22 so that the speed of rotation of the motor 132 is varied to provide a centrifugally generated force balancing the force due to the air supplied to the chamber 124. Since the speed of rotation of the motor 132 is representative of the force to be measured, suitable means, such as those shown in FIGS. 1 and 2 of the drawings, can be provided for determining the speed of rotation of the motor 132.

Referring now more specifically to the diaphragm assembly 130, this assembly includes a cup-shaped member 136 that is secured to an upper end of a shaft 138 by a pin 140. The edge of a circular and flexible diaphragm 142 made of a suitable material, such as a nylon-rubber composition, is clamped between a shouldered portion 136a of the element 136 and the lower surface of a flanged portion 144a on the lower end of a sleeve 144. The sleeve 144 is held in position by a flange 136b on the member 136 that is swaged or rolled over into engagement with the end of the flanged portion 144a. A vertically movable rigid wall element of the diaphragm assembly 130 is provided by a piston member 146 which includes a flanged portion 146a and which is centrally secured to a shaft 148 aligned with the shaft 138.

The lower surface of the diaphragm 142 and the upper surface of the element 136 define a cavity 150 in which is disposed a quantity of a suitable liquid 152. As indicated above, the liquid 152 can have different specific gravities in dependence on the speed at which the motor 132 is to operate or the range of pressure of the fluid supplied to the chamber 124 and can comprise mercury, alcohol or oil, for instance. In FIG. 3 of the drawings, the position occupied by the body of liquid 152 is that produced when the diaphragm assembly 130 is being rotated by the drive motor 132. The action of centrifugal force on the liquid 152 moves the liquid radially outward away from the axis of rotation of the shafts 138 and 148 so that the central portion of the cavity 150 is evacuated. Because of the restraining influence exerted by the side walls of the cavity 150, the centrifugally induced outward movement of the liquid 152 provides an axially directed force. This force is used to balance the force due to the air under pressure acting on the exposed surfaces of the diaphragm 142 and the piston element 146.

The diaphragm assembly 130 is rotated at controlled speeds by the variable speed drive means or motor 132. This motor can be secured to the housing 122, or this housing can be enlarged so that the motor 132 is disposed within the chamber 124. The motor 132 includes an output shaft 154 that is mounted for rotary movement in a bearing 156 carried on the supporting frame 126. The upper end of the motor shaft 154 is connected to the lower end of the shaft 138 by a sleeve 158. The lower end of the shaft 138 is also rotatably mounted in a bearing 160 carried on the frame 126. A plate 162 secured to the frame 126 includes a boss 162a containing a bearing means 164 for rotatably mounting the intermediate portion of the shaft 138. A compression spring 166 is interposed between a lower end of the bearing means 164 and the upper end of the bearing 160. Thus, the shaft 138 is mounted for rotary motion and is restrained against axial or translatory movement. When the motor shaft 154 is rotated, rotary motion is transmitted through the shaft 138 to the cup-shaped member 136 of the diaphragm assembly 130. This rotary motion is transmitted to the piston 146 and the shaft 148 through the resilient diaphragm 142. As described above, rotation of the diaphragm assembly 130 results in upwardly or downwardly directed movement of the piston 146, determined by the pressure of the air supplied to the chamber 124, so that the shaft 148 is supplied with components of both translatory and rotary movement.

To provide for this movement of the shaft 148, a generally cylindrical plate 168 is mounted on the frame 126 and includes a boss 168a in which bearing means 170 are mounted. The bearing means 170 permit both axially directed translatory movement of the shaft 148 and also rotary movement thereof.

Displacement of the piston 146 in the diaphragm assembly 130 is detected by the sensing assembly 134. Although this assembly can comprise any one of the sensing means well known in the art, the means 134 illustrated in FIG. 3 comprises a differential transformer similar to the ones provided in the force measuring units 10 and 100. Thus, the sensing means 134 includes a magnetic core 172 that is mounted on the upper end of the shaft 148 to be disposed within the axial opening of a group of windings 174. The windings 174 are supported on the upper wall of the housing 122 by a flanged sleeve 176. The leads to the windings 174 extend out of the housing 122 through suitable sealed terminals and are connected to a control circuit similar to the control circuit 22. This control circuit is connected to the motor 132 so that the speed of rotation thereof is adjusted in accordance with the movement of the core 172 and consequently, the movement of the piston 146.

To provide an indication of the speed of rotation of the motor 132 and the pressure of the air supplied to the chamber 124, any suitable detecting and indicating means, such as the means 26 shown in FIGS. 1 and 2, can be supplied. The unit 121 is illustrated as including an optical speed detecting system in which a series of alternate light and dark areas are formed on an outer cylindrical surface 178 on the element 136. An opening 180 is formed in a portion of the frame 126 adjacent the diaphgram assembly 130 so that light from a source (not shown) reflected from the surface 178 impinges on a photocell 182. The alternate light and dark areas on the surface 178 control the photocell 182 to supply a series of pulses proportional in number or rate to the speed at which the diaphragm assembly 130 is rotated. These pulses can be used to control a counting circuit of any of the well known types.

In operation, the chamber 124 defined by the sealed housing 122 is provided with air having a pressure representing the force to be measured. This compressed air acts on the exposed portions of the diaphragm 142 and the upper surface of the piston 146 to provide a force tending to displace the piston 146. This displacement is effective through the shaft 148 to displace the magnetic core 172 so that the windings 174 of the differential transformer supply a control signal to the control circuit (not shown). The control circuit now supplies a signal to the motor 132 that is effective to increase or decrease the speed of rotation of the diaphragm assembly 130 so that an increased or decreased force parallel to the axis of rotation of the shafts 138, 148 and 154 is centrifugally generated. If an increase in the pressure of the air within the chamber 124 displaces the piston 146 downwardly, the speed of rotation of the motor 132 is increased so that an increased centrifugal force acting on the liquid 152 produces a greater upwardly directed force offsetting the increased pressure of the air. Conversely, when the pressure of the air within the chamber 124 is decreased so that the centrifugal force acting on the liquid 152 tends to displace the piston 146 and the core 172 upwardly, the control circuit reduces the speed of rotation of the motor 132 so that the centrifugally generated balancing force is reduced in magnitude. An indication of the speed of rotation of the assembly 130 or the motor 132 is provided either by the generation of a pulse or signal stream by the photocell 182 or by the magnetic generating means shown in FIGS. 1 and 2.

Although the present invention has been described with reference to three illustrative embodiments thereof, it should be understood that numerous other modifications and embodiments can be devised by thoses skilled in the art that will fall within the spirit and scope of the principles of this invention.

What is claimed and desired to be secured by Letters Patent of the United States is:

A force transducer comprising a sealed chamber, bellows means disposed in said chamber and containing a liquid, means for introducing a fluid into said chamber having a pressure representing a force to be measured, said fluid being applied to all of the walls of the bellows assembly and acting on said bellows means to displace said bellows means in one direction, drive means including a drive motor mounted in a fixed position relative to the chamber and having a drive shaft secured to said bellows means for rotating said bellows means, first bearing means mounting said drive shaft for only rotary movement, rotation of said bellows means acting on said bellows means to displace said bellows means in a direction opposite to said one direction, control means controlled by displacement of said bellows means for controlling the speed of said drive means, said control means including position sensing means mounted in a fixed position relative to the chamber coaxial with the drive shaft and having an element carried on said bellows means in a position axially aligned with said drive shaft, second bearing means mounting said element for rotary movement and for translatory movement along the axis of rotation of the drive shaft, and indicating means responsive to the rotation of said bellows means for providing an indication of the force to be measured.

References Cited by the Examiner

UNITED STATES PATENTS

| 1,222,985 | 4/17 | Pharo | 73—523 |
| 2,600,271 | 6/52 | Schaevitz. | |
| 2,620,665 | 12/52 | Carlisle et al. | 73—398 |
| 2,659,390 | 11/53 | MacLea et al. | 73—398 X |
| 2,814,768 | 11/57 | Kinkel | 73—398 X |
| 2,905,000 | 9/59 | Roth | 73—398 X |
| 2,906,120 | 9/59 | Buck | 73—398 X |
| 3,113,459 | 12/63 | Slater | 73—398 |

FOREIGN PATENTS 733,226 3/43 Germany.

RICHARD C. QUEISSER, *Primary Examiner.*
ROBERT L. EVANS, DAVID SCHONBERG,
*Examiners.*